Nov. 3, 1931.  C. MARTELL  1,829,997

COMPOSITION OF MATTER AND METHOD OF ITS PREPARATION

Filed Sept. 27, 1928

Inventor
Charles Martell
by [signature] Att'y.

Patented Nov. 3, 1931

1,829,997

UNITED STATES PATENT OFFICE

CHARLES MARTELL, OF CICERO, ILLINOIS, ASSIGNOR TO WESTERN ELECTRIC COMPANY, INCORPORATED, OF NEW YORK, N. Y., A CORPORATION OF NEW YORK

COMPOSITION OF MATTER AND METHOD OF ITS PREPARATION

Application filed September 27, 1928. Serial No. 308,610.

This invention relates to compositions of matter and methods of their preparation, and more particularly to compositions used in electrical industries for their insulating and other electrical properties.

The invention further relates to insulating compositions containing rubber and balata or their equivalents, which compositions have stabilized electrical characteristics and mechanical properties adapting them to be used for the insulation of submarine cables, and more specifically to certain such compounds having lower dielectric constants and lower conductance and capacitance than gutta-percha, and being therefore especially adapted for insulation of submarine cables for high frequency transmission.

The objects of the invention are to provide a composition having in a high degree the characteristics desirable in insulating materials, especially for use under water, and to provide an insulating material and its method of production having in a high degree the characteristics desirable in cables, particularly in cables employed for telephonic communication or other relatively high frequency transmission.

A further object is to provide a cable insulating material which is superior to, and at the same time cheaper to manufacture than gutta-percha.

In accordance with one form of the invention, rubber or similar hydro-carbon substances and balata are mixed together to form the compound, each of the ingredients having been treated by special processes fully set forth hereinafter. The proportions of the ingredients, and the precise composition of each of the ingredients themselves, may be varied considerably and still be effective in securing the desired properties.

Figure 1:
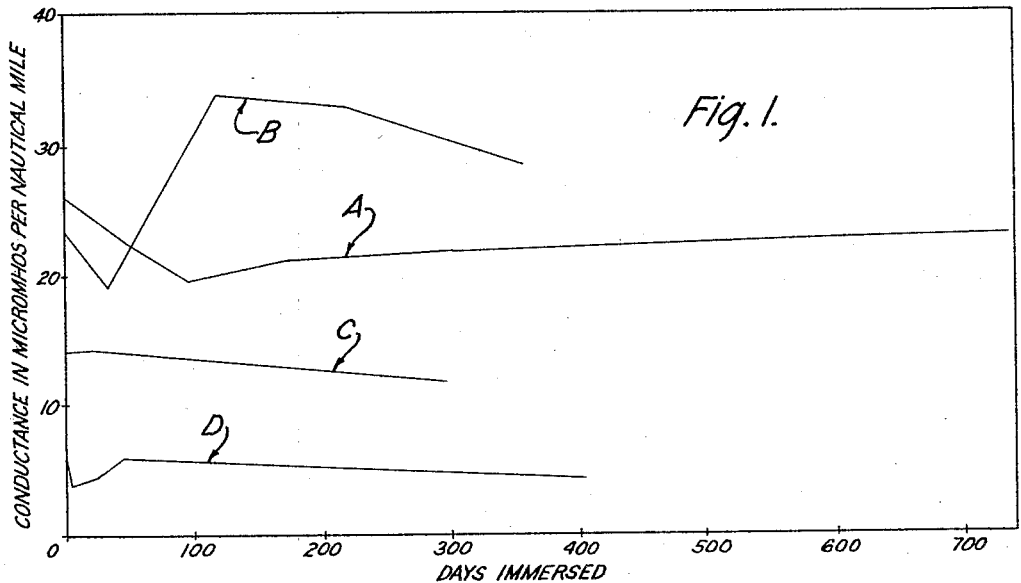
Figure 2:
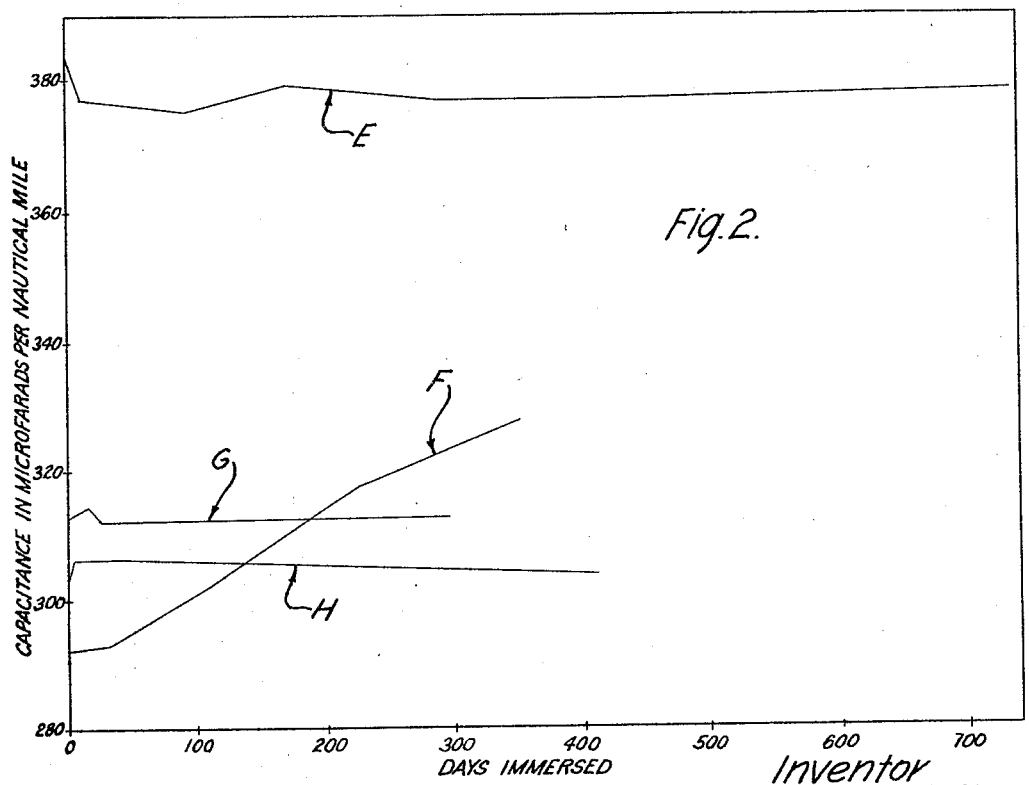

The invention and its relation to the prior art will be understood from the following description, taken in connection with the attached drawings, in which Figs. 1 and 2 are graphical representations of comparative data obtained experimentally from samples of insulating materials prepared in accordance with this specification, and from other materials, as will be further described.

Gutta-percha is the only material which has been generally accepted as suitable for the insulation of submarine cables with high transmission qualities. Various substitutes for gutta-percha have been proposed, including vulcanized rubber, as disclosed in the application of R. R. Williams and A. R. Kemp, Serial No. 678,509, filed December 4, 1923. The disadvantage of the vulcanized rubber insulation formed in accordance with the above application is that it, like all rubber insulators, must be vulcanized in position on the conductor, and the cable core is very likely to become deformed during the process of vulcanization, unless expensive and cumbersome precautions are taken. Also vulcanizable rubber alone is too resilient to be extruded in an extrusion press, which fact necessitates the inclusion in it of some solid, finely divided filler, which has the undesirable effect of raising the dielectric constant of the finished insulation.

It has also been proposed to use raw rubber in admixture with vegetable waxes as a submarine insulating compound. Such a compound is described in United States Patent No. 699,383, dated May 6, 1902, to Adolf Gentsch, and it has been found that such compounds may possess fairly satisfactory mechanical properties. However, they are not electrically stable, and it is for this reason that they have not been adopted for use in insulating submarine cables.

In experiments with rubber for use in submarine insulating compounds it has been found that in the unmixed, unvulcanized state, thoroughly washed, crude rubber is not electrically stable when immersed in water. Sheets of such rubber, during immersion in sea water, undergo a gradual increase of dielectric constant and decrease of insulation resistance up to a certain point, when sudden and almost complete failure of the material in respect to insulating properties occurs. It appears that this sudden failure of crude rubber in water is due to protein films which pervade the mass, forming, when thoroughly wet, paths of low electrical resistance throughout the rubber. It is therefore desirable when unvulcanized rubber is to form an ingredient of a submarine insulation that this tendency to sudden degradation should first be eliminated from the raw materials, and this result can be accomplished by eliminating or materially reducing the protein content of the rubber.

A satisfactory process for treating the rubber is disclosed in the copending application of A. R. Kemp, Serial No. 215,235, filed August 24, 1927, wherein the rubber, either in the state of commercial crude rubber or of uncoagulated latex, is subjected to the action of water at a temperature above 100° C. for several hours to render the proteins soluble, and is then washed and dried. The resulting product is a rubber which retains its insulating and electrical properties practically unimpaired for long periods of time when immersed in a salt solution similar to sea water. It is perhaps the best material at present available as an ingredient in the composition of the present invention, but obviously any other rubber product having satisfactory electrical and mechanical properties may be used, although prepared by an entirely different process.

For the sake of distinctness, certain of the terms used in the present specification and claims are defined as follows:

*Rubber.*—Various species of rubber, such as are known as Hevea, Castilloa, Guayule and others, whether in the form of latex, artificial dispersion, or in solid unvulcanized form.

*Balata.*—A gum obtained from the milky fluid of the tree known to biologists as the Mimusops balata or globosa.

*Thermo-plasticity.*—That property of matter which causes it to become plastic when heated to the neighborhood of the temperature of boiling water, and which therefore makes it possible to extrude the matter from an extrusion press while hot. This property is not possessed by ordinary rubber, but is possessed by balata, and also by the composition made in accordance with this specification.

In practicing one embodiment of the invention, rubber latex has been diluted with water in the proportion of one part of latex to four parts of water, the mixture being then subjected to 50 pounds steam pressure for nine hours. A 5% solution of acetic acid (1,000 c. c. per gallon of undiluted latex) was then added to coagulate the latex, and the water was then removed from the coagulum by passing it between rolls until the moisture content was reduced to about 5%. The foregoing steps are disclosed in the above mentioned application of A. R. Kemp.

Raw balata blankets were cut into strips, and the strips were immersed in gasoline for about twelve hours, until about 90% of the resins were extracted therefrom, after which they were dried. The weight of the balata after leaching was equal to that of the rubber content of the coagulum. The rubber and balata were then washed together for one hour in a rubber washer. In the present specification and claims, the term "deresinated balata" includes any balata gum the resin content of which is sufficiently low to permit its use in this composition. It is possible to secure a fairly satisfactory composition by using a good commercial grade of balata without deresinating, but on account of the tendency of the resins to soften the rubber and impair the electrical stability of the product, a more or less thorough deresination will usually be found advisable.

The mixture of rubber and balata was then dried in a hot masticator, strained, and masticated in a masticator of usual type until the moisture content was reduced to about 2%. The mixture was then placed in a cable-extrusion machine, where it was further heated and extruded about copper conductors to form cable cores in the well known manner.

The cores formed as above described, and other cores formed of insulating material containing the same ingredients with the addition of varying amounts of Montan wax, were immersed in water and tested to determine their electrical characteristics, the tests being carried on over a period of months to determine the deterioration, if any, due to the effect of water on the insulating material. The following tables show the results obtained in these tests, the corresponding values for a typical gutta-percha cable being also given for comparison. The values given are the means of various readings taken over an extended period of time, the specimens being tested at temperatures of about 75° F., atmospheric pressure, and subjected to an alternating current of 900 cycles per second. The outer diameter of each core was approximately 0.47 inches.

| Material of core | Capacitance in microfarads per nautical mile | Conductance in micromhos per nautical mile | Dielectric constant | Phase difference angle in radians |
|---|---|---|---|---|
| Gutta-percha | .379 | 22.0 | 3.35 | .0107 |
| 50% rubber, 50% balata, 0% wax | .254 | 3.1 | 2.60 | .0022 |
| 45% rubber, 45% balata, 10% wax | .250 | 6.6 | 2.58 | .0048 |
| 40% rubber, 40% balata, 20% wax | .263 | 10.2 | 2.70 | .0069 |
| 35% rubber, 35% balata, 30% wax | .258 | 10.3 | 2.67 | .0071 |

Referring to the drawings, Fig. 1 shows comparative curves A, B, C and D plotted from data obtained from the test cores and shows the variations in the conductance of the insulation when immersed in water. Curve A is inserted merely for purposes of comparison, and shows the behavior of a typical high grade gutta-percha such as is commonly used in submarine cable cores. Curve B represents a core containing rubber, balata and Montan wax in the proportions of 36%, 20%, 44%, wherein the rubber and wax were treated as above noted but the balata was not treated to remove the resins. Curve C represents a core containing rubber, balata and Montan wax in the proportions of 35%, 30%, 35%, each of the ingredients having been purified as above noted. Curve D represents a core embodying the present invention, containing deproteinized rubber and deresinated balata in equal proportions, with no wax.

Fig. 2 shows variations in the capacitance of the same cores, the curves E, F, G and H representing the results from cores corresponding respectively with those upon which curves A, B, C and D of Fig. 1 are based. From curves B and F the desirability of purifying the balata is evident, although it is apparent that the compound from which curves B and F were derived may be used where the requirements are not too exacting. Curves C and G illustrate the behavior of a satisfactory wax compound, such as is fully disclosed in the copending application of Charles Martell, Serial No. 308,611, filed Sept. 27, 1928. Curves D and H show that a superior compound may be made according to the present invention from rubber and balata alone, the electrical characteristics of such compound being at all times superior to those of gutta-percha, and the compound being practically unaffected by immersion in water.

It should be noted that the above curves show the values at room temperature and atmospheric pressure, and that when the cores are subjected to the temperatures and pressures existing at sea bottom they show a marked improvement in regard to their electrical properties, both the conductance and the capacitance decreasing considerably. Gutta-percha insulated cable cores do not change appreciably in capacity with increased pressure and reduced temperature, but their conductance increases considerably. Thus, at deep-sea conditions of temperature and pressure a gutta-percha insulated core of the above dimensions has a conductance of about 50 micromhos per nautical mile.

These curves, as well as the data given in the above table, show that with respect to each of the electrical characteristics measured in the tests compositions made in accordance with this invention are distinctly superior to gutta-percha. The time of treatment at any particular temperature, for any specific requirements, and for specific grades of materials, at variance with those already described, must be experimentally determined. However, the specific procedure described above is typical of those which produce materials having satisfactory properties.

The preferred proportions of the ingredients to each other may be varied considerably, depending upon the nature of the materials used, and the specific requirements of the insulator to be made. In general, an increase in the rubber content results in improved electrical qualities, but tends to make the composition too resilient to permit proper extrusion to accurate dimensions in the cable-extrusion presses now in use in the industry, and also makes the product subject to deformation at ordinary temperatures. An increase in the proportion of balata tends to prevent cold flow of the material and increases its thermo-plasticity and toughness, but increases the cost of the composition.

The product, if made in accordance with this specification, should be, in respect both to electrical and mechanical characteristics, superior to gutta-percha, and at the present market prices considerably cheaper than gutta-percha. Tackiness may be completely avoided and the electrical properties perfectly stabilized. Compositions may thus be obtained possessing characteristics which adapt them to the most stringent requirements for submarine cables. They are superior in electrical characteristics to any materials previously used for the purpose and, in conjunction with the development of modern loading materials, make possible long cables of reasonable dimensions, suitable for the transmission of speech frequencies, which heretofore have been regarded as commercially unattainable. The compound when heated to about 80° C. is sufficiently plastic to be extruded in the cable-extruding machine now in use in the industry. No vulcanization or other subsequent treatment is necessary. The specific gravity of the finished product varies from about 0.95 to 0.99.

It has been determined for Hevea rubber that a reduction in the nitrogen content (which is approximately proportional to the protein content) to one-half that in the corresponding commercial crude rubber results in a satisfactory ingredient in submarine cable insulation compounded in accordance with this invention. It may be found that for such use a smaller reduction will suffice, or that for use in moist air or under less extreme conditions a still smaller reduction will be sufficient to stabilize the electrical properties of the product. It may also be found that the deleterious effect of the proteins may be avoided by coagulating them or otherwise modifying them to render them harmless. The term "deproteinized rubber" as used in the claims of this application, is therefore intended to include any rubber the protein content of which has been so reduced or modified, or any natural or synthetic rubber having a sufficiently low protein content, as to produce a composition having stabilized electrical properties.

Gutta-percha or other similar gums may, if desired, be used to partially or wholly replace the balata in the composition, and to impart toughness and plasticity to the material.

From the electrical data given above, it is apparent that the composition prepared in accordance with this specification is much better adapted as to electrical characteristics for insulation of conductors for high frequency transmission than is gutta-percha. Of importance in this connection are the low dielectric losses in the composition at speech or carrier frequencies. The smaller the power factor, and, therefore, the phase difference angle, the lower will be the dielectric losses.

Although this invention has been described from the point of view of submarine cable insulation, it is obvious that it has a more general application to insulating materials and especially to such materials which may be subjected to the influence of humidity or water. The product resulting from the method herein disclosed may be readily vulcanized and may in that form find a broad application as an insulating material.

What is claimed is:

1. An insulating material consisting substantially entirely of balata and a product resulting from the treatment of rubber to remove the proteins, in which the rubber product and balata are present in substantially equal proportions.

2. An insulating material consisting substantially entirely of rubber and balata, said insulating material being of approximately equal parts of deproteinized rubber and deresinated balata.

3. A composition of matter consisting substantially entirely of rubber and balata, said composition being of approximately equal parts of deproteinized rubber and balata.

4. A composition of matter consisting substantially entirely of deproteinized rubber, and a gum exudate other than rubber and having properties similar to balata.

5. A composition of matter consisting substantially entirely of rubber hydrocarbon with a low nitrogen content, and a purified gum exudate other than rubber and having properties similar to balata.

6. An insulating material consisting substantially entirely of rubber hydrocarbon with a low nitrogen content, and a purified gum exudate other than rubber, the material being characterized by a lower dielectric constant than gutta-percha.

7. An insulating material consisting substantially entirely of rubber and balata, having electrical characteristics superior to high-grade gutta-percha and substantially unaffected by immersion in water for 200 days.

8. An article of manufacture consisting substantially entirely of rubber hydrocarbon having low water-absorption characteristics, and a purified vegetable gum other than rubber and having properties similar to balata.

9. The method of producing an insulating material from rubber and balata, which consists in rendering soluble the water-absorbing constituents of the rubber, simultaneously washing and mixing the rubber and balata, and continuing the mixing until a homogeneous product is obtained.

10. The method of producing an insulating material from rubber latex and balata, which consists in heat-treating the latex to render soluble the water-absorbent substances naturally present in the latex, coagulating the latex, adding balata thereto, and simultaneously washing and mixing the rubber and balata.

11. An electrical insulating material consisting substantially entirely of deproteinized rubber and deresinated balata intimately commingled together, the material being characterized by a lower dielectric constant than gutta percha and being substantially unaffected by immersion in water for 200 days.

In witness whereof, I hereunto subscribe my name this 14th day of September, A. D. 1928.

CHARLES MARTELL.